United States Patent
Shiraishi et al.

[11] Patent Number: 5,093,790
[45] Date of Patent: Mar. 3, 1992

[54] ANTI-SKID BRAKE CONTROL SYSTEM

[75] Inventors: Masaru Shiraishi; Haruki Okazaki; Fumio Kageyama, all of Hiroshima, Japan

[73] Assignee: Mazda Motor Corporation, Hiroshima, Japan

[21] Appl. No.: 546,932

[22] Filed: Jul. 2, 1990

[30] Foreign Application Priority Data

Jun. 30, 1989 [JP] Japan .................... 1-170915
Jul. 14, 1989 [JP] Japan .................... 1-183453

[51] Int. Cl.⁵ .................... B60T 8/58
[52] U.S. Cl. .................... 364/426.02; 180/197; 303/95
[58] Field of Search .................... 180/197; 364/426.02, 364/426.03; 303/95, 97

[56] References Cited

U.S. PATENT DOCUMENTS

| | | | |
|---|---|---|---|
| 4,511,971 | 4/1985 | Dittner et al. | 364/426.02 |
| 4,671,579 | 6/1987 | Sawano et al. | 364/426.02 X |
| 4,736,994 | 4/1988 | Fennel et al. | 364/426.02 X |
| 4,763,262 | 8/1988 | Leiber | 364/426.03 |
| 4,765,430 | 8/1988 | Schulze et al. | 364/426.03 X |
| 4,850,446 | 7/1989 | Leiber et al. | 364/426.03 X |
| 4,871,043 | 10/1989 | Fujii et al. | 180/197 X |
| 4,933,855 | 6/1990 | Leiber et al. | 364/426.03 |
| 4,946,015 | 8/1990 | Browalski et al. | 364/426.03 X |
| 4,947,332 | 8/1990 | Ghoneim | 364/426.03 |
| 4,955,448 | 9/1990 | Ise et al. | 364/426.02 X |
| 4,981,190 | 1/1991 | Nakayama et al. | 364/426.02 X |
| 4,984,649 | 1/1991 | Leiber et al. | 364/424.1 X |

Primary Examiner—Parshotam S. Lall
Assistant Examiner—Thomas S. Auchterlonie
Attorney, Agent, or Firm—Fish & Richardson

[57] ABSTRACT

An anti-skid brake control system comprises anti-skid brakes fitted to respective drive wheels of an automotive vehicle. When the anti-skid brakes are operated and the rotation of the driven wheels subsequently starts restoration, the inertia moment of a power train drivingly coupled with such driven wheels tending to hamper the restoration is reduced. In other words, until the rotation of the drive wheels is restored, the inertia moment of the power train acts to avoid any possible abrupt drop of the wheel speed of at least one of the driven wheels tending to be locked.

15 Claims, 11 Drawing Sheets

ANTI-SKID BRAKE CONTROL SYSTEM

BACKGROUND OF THE INVENTION

1. Field of the Invention

The present invention relates to an anti-skid brake control system for a vehicle.

2. Description of Related Art

It is often experienced that, when an automotive vehicle is abruptly braked or when an automotive vehicle is braked while running on a slippery surface such as a snow-covered ground surface, the automotive vehicle tends to skid as a result of the wheels being locked. Once this occurs, the automotive vehicle requires an increased braking distance over which the automotive vehicle runs or skids before it stops completely.

An anti-skid brake control system, often referred to as ABS, is known as a system for improving the braking performance of an automotive vehicle, including a reduction in braking distance, in such a way as to control the application of a braking force to automotive wheel brakes to avoid the occurrence of such a skid. The anti-skid brake system now in use is available in various types, one of which is disclosed in for example, Japanese Unexamined Patent Publication (kokai) No. 102,363/1986.

According to the above mentioned patent publication, the anti-skid brake control system comprises a brake control means operable to control a liquid pressure to be applied to a wheel brake cylinder used for each vehicle wheel for applying a braking force thereto, a wheel speed detecting means for detecting the rotational speed of each of the vehicle wheels, and a controller operable to calculate the slip ratio of the rotational speed of each vehicle wheel relative to the vehicle running speed in reference to respective signals supplied from the wheel speed detecting means and then to output a control signal, necessary to avoid a possibility of the associated wheel being locked, to the brake control means in dependence on the calculated slip ratio.

It has, however, been found that the use of the prior anti-skid brake control system of the above described construction often brings about the following problem. The anti-skid brake control system disclosed in the above mentioned patent publication operates in such a manner that, when an incipient skid condition occurs in which the vehicle wheels being braked exhibit a tendency of being locked, the anti-skid brake control system is brought into operation to reduce the braking force being applied to each wheel brake cylinder. The wheel speed is lowered to a certain extent by the effect of an inertia even after the anti-skid brake control system has been brought into operation, and thereafter the wheel speed increases to a value approaching the vehicle running speed. Should the inertia moment of a power train through which a drive of an automotive engine is transmitted to the vehicle wheels be relatively large (such as occurring, for example, when a clutch interposed between the automotive engine and an automotive transmission is coupled to transmit the drive of the automotive engine to the automotive drive wheels, or when in the case of a four-wheel drive (4-WD), or tandem drive, vehicle a 2-WD/4-WD changeover clutch disposed in the power train is set in a 4-WD mode), a relatively large resistance from the power train acts, when the wheel speed restores to a value substantially equal to the vehicle running speed, in a direction tending to suppress the restoration of the wheel speed and, therefore, the complete restoration of the wheel speed requires a relatively long time.

Japanese Unexamined Patent Publication (kokai) No. 43,355/1987 discloses the requirement for the four-wheel drive, or tandem drive, vehicle equipped with the anti-skid brake control system to satisfy. According to this patent publication, it is described that, when the braking is desired, the 2-WD/4-WD changeover clutch in the power train has to be switched over from the 4-WD mode to the 2-WD mode before the anti-skid brake control system is brought into operation. However, the system disclosed in this patent Publication has a problem in that, since the braking requires to be immediately followed by the changeover from the 4-WD mode onto the 2-WD mode with the inertia moment of the power train lowered consequently, the wheel speed tends to be abruptly reduced consequent upon the braking, causing the vehicle wheels to be susceptible to a locked condition.

SUMMARY OF THE INVENTION

Therefore, the present invention is intended to provide an improved anti-skid brake control system for use in an automotive vehicle having drive wheels equipped with an anti-skid means, which system is designed to improve the braking performance.

The present invention has another object to provide an improved anti-skid brake control system of the type referred to above, which is designed to facilitate the restoration of the wheel speed of the drive wheels on which the anti-skid means acts.

A further object of the present invention is to provide an improved anti-skid brake control system effective to avoid any possible premature locking of the driven wheels.

According to the present invention, these objects can be accomplished by providing an improved anti-skid brake control system for use in an automotive vehicle having a Plurality of driven wheels, which system comprises an anti-skid means operatively associated with each of the driven wheels and operable to lower a braking force applied to the respective driven wheel during braking operation in which the driven wheel is incipiently locked; and an inertia moment varying means operable to reduce an inertia moment of a power train for the driven wheel on which the associated anti-skid means acts, during a latter half of a period in which the anti-skid means is operated. This arrangement can hamper an obstruction of interfering with the restoration of the wheel speed due to a reduction in the inertia moment of the power train in a latter stage in which the anti-skid means is operated.

Conversely, any possible abrupt drop of the wheel speed of the drive wheel tending to be locked under the influence of the inertia moment of the power train can be avoided during the stage of operation in which the anti-skid means is operated, and therefore, it is possible to secure a length of time required for the anti-skid means to suppress the occurrence of the driven wheels being locked.

BRIEF DESCRIPTION OF THE DRAWINGS

Other objects, features and advantages of the present invention will become apparent in the course of the description of the preferred embodiments, which follows, in conjunction with the accompanying drawings.

However, the embodiments and the drawings are given only for the purpose of illustration and explanation, and are not to be taken as limiting the scope of the present invention in any way whatsoever, which scope is to be determined solely by the appended claims. In the accompanying drawings, like reference numerals are used to denote like parts throughout the several views.

DETAILED DESCRIPTION OF THE EMBODIMENTS

The present invention will be described more in detail by way of examples in conjunction with the accompanying drawings.

Figure 1:
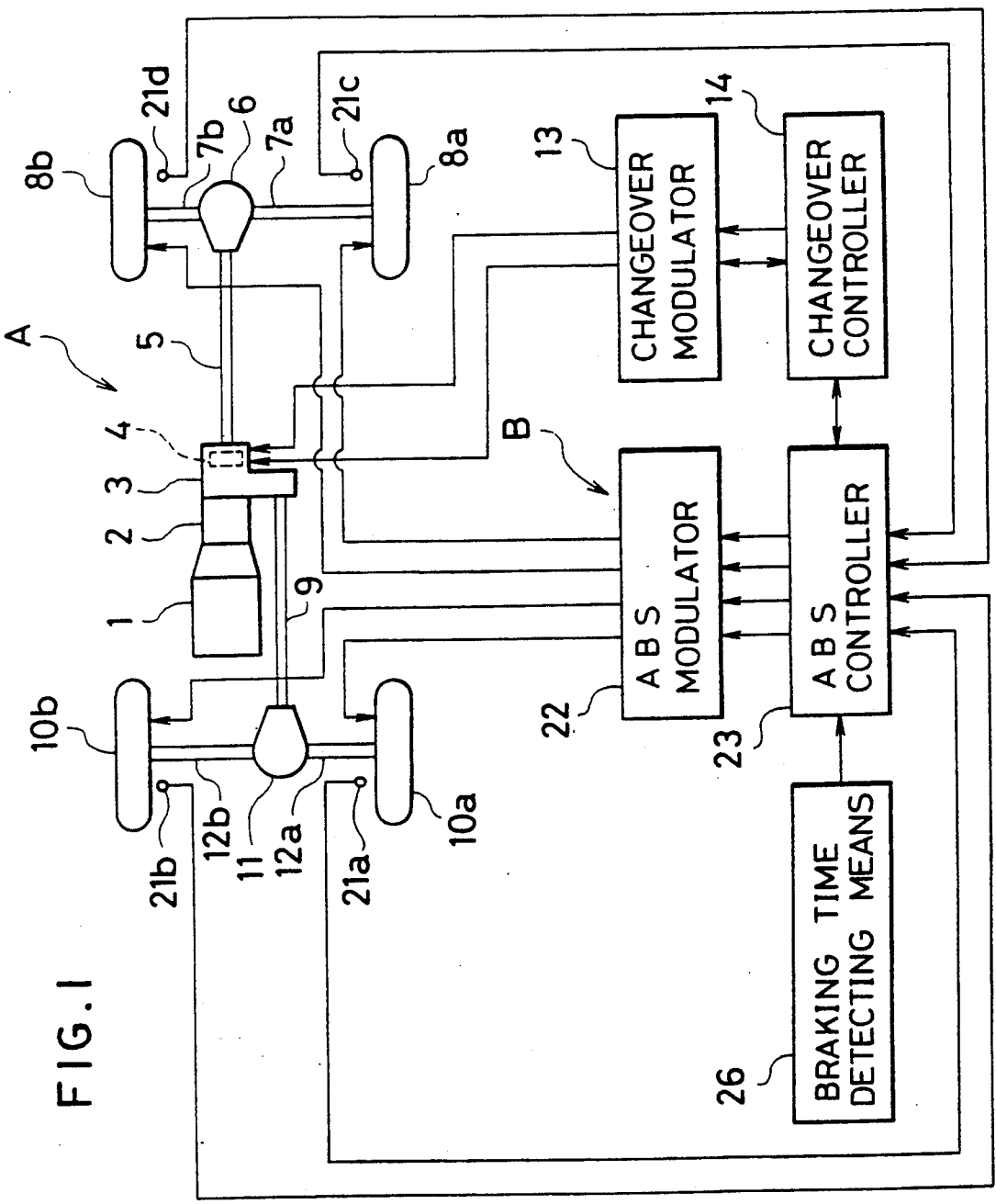
FIG. 1 is a schematic diagram showing an anti-skid brake control system according to a first preferred embodiment of the present invention, which system is shown as applied in a 4-wheel drive system of a tandem drive automotive vehicle.
Figure 2:
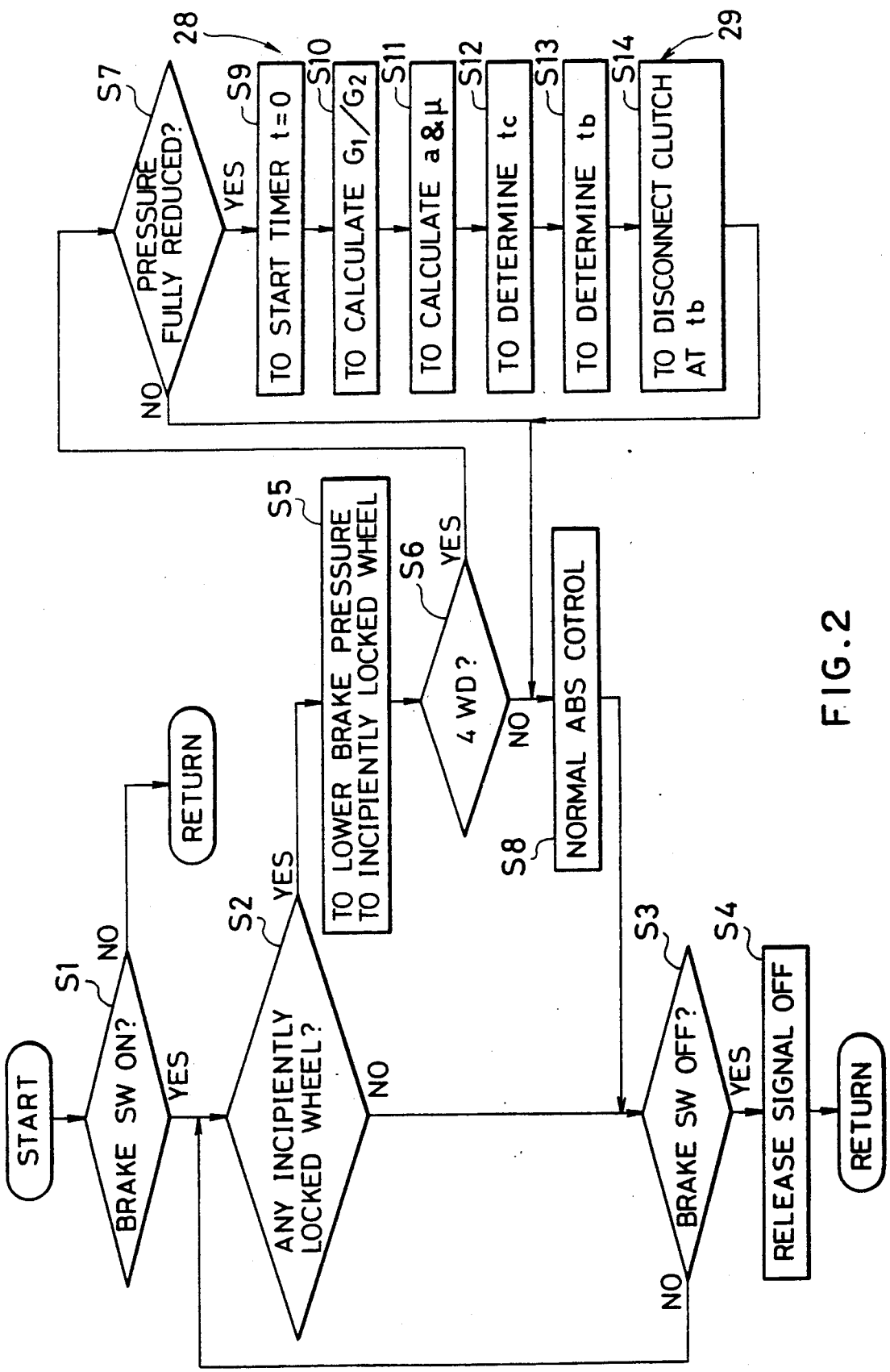
FIG. 2 is a flowchart showing the sequence of operation of the anti-skid brake control system shown in FIG. 1.
Figure 3:
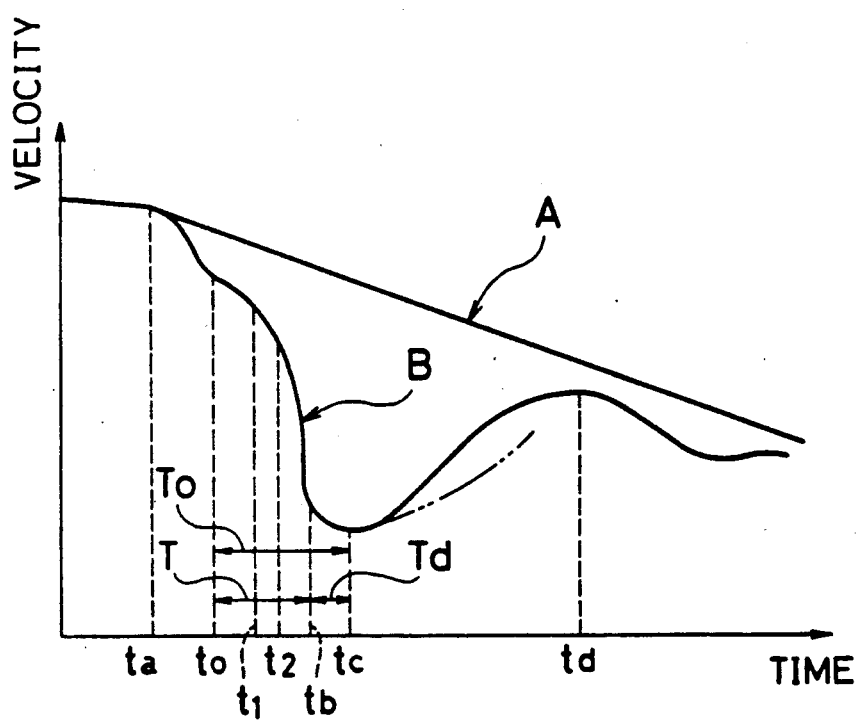
FIG. 3 is a graph showing a change in vehicle running speed and that in wheel speed during the braking.

First Preferred Embodiment (FIGS. 1 to 3)

Referring first to FIG. 1, there is schematically shown an anti-skid brake control system (ABS system) as applied to a 4-wheel drive system of a tandem, or four-wheel, drive automotive vehicle. An automotive power plant includes a combustion engine 1 having a drive output shaft drivingly coupled with any known transmission 2, the drive of said combustion engine 1 being transmitted to a transfer 3 after the number of revolutions of the drive output shaft has been adjusted by the transmission 2. The transfer 3 includes a 2-WD/4-WD changeover clutch 4 capable of assuming selectively one of 2-WD and 4-WD drive modes.

When the 2-WD/4-WD changeover clutch 4 is set in the 2-WD drive mode, the drive of the engine 1 transmitted to the transfer 3 through the transmission 2 is in turn transmitted through a rear propeller shaft 5 to a rear differential gear unit 6 which acts to distribute the transmitted engine drive to left-hand and right-hand rear driven wheels 8a and 8b through respective rear axles 7a and 7b, thereby to drive the rear drive wheels 8a and 8b. In this 2-WD drive mode, no drive of the engine 1 is transmitted to a front propeller shaft 9 drivingly coupled with left-hand and right-hand front wheels 10a and 10b through a front differential gear unit 11 and then through respective front axles 12a and 12b, allowing the front wheels 10a and 10b to rotate freely. The 2-WD drive mode renders the automotive vehicle to be a rear-wheel drive model.

On the other hand, when the changeover clutch 4 is set in the 4-WD drive mode, the automotive vehicle is rendered to be a tandem drive model in which both of the rear wheels 8a and 8b as well as the front wheels 10a and 10b can be driven by the engine 1. In this case, the changeover clutch 4 set in the 4-WD drive mode couples the front propeller shaft 9 with the transfer 3 so that the drive of the combustion engine 1 can be distributed to both of the rear and front propeller shafts 5 and 9. Thus, in the 4-WD drive mode, the drive of the engine 1 is transmitted in part to the front wheels 10a and 10b through the front differential gear unit 11 and then through the respective front axles 12a and 12b and in part to the rear driven wheels 8a and 8b through the rear differential gear unit 6 and then through the respective rear axles 7a and 7b.

The selective switching of the changeover clutch 4 to assume one of the 2-WD and 4-WD drive modes is controlled by a changeover modulator 13 which is in turn controlled by a controller 14. The system so far described constitutes a power train through which the drive of the engine 1 is transmitted to the wheels, including a tandem or four wheel drive device A capable of selectively switching between the 2-WD drive mode and the 4-WD drive mode.

The four-wheel drive automotive vehicle so far shown includes, in addition to the four wheel drive device A, an anti-skid brake control device B. The anti-skid brake control device B comprises four wheel speed detecting means 21a, 21b, 21c and 21d each operable to detect, and generate a wheel speed signal indicative of, the number of turn of the respective wheel 10a, 10b, 8a and 8b, that is, the wheel speed of the respective wheel. Each of those wheel speed detecting means 21a to 21d may be any known tachometer or any other suitable speed sensor. The anti-skid brake control device B also comprises an anti-skid brake control modulator (ABS modulator) 22 and an anti-skid brake controller (ABS controller) 23. The ABS controller 23 is electrically coupled with the wheel speed detecting means 21a to 21d and is operable to utilize the respective speed signals from the wheel speed detecting means 21a to 21d to calculate the slip ratio of each of the respective wheel speeds of the wheels 10a, 10, 8a and 8b relative to the vehicle running speed and also to output control signals to the ABS modulator 22 so that the brake pressure being applied to each wheel 10a, 10b, 8a and 8b, can be adjusted to refrain the slip ratio from exceeding a respective predetermined value.

The changeover controller 14 of the four wheel drive device A and the ABS controller 23 of the anti-skid brake control device B are electrically connected to communicate with each other. A braking detecting means 26 operable to detect the timing at which the braking is effected, that is, the timing of control of automotive brakes one for each wheels, feeds an output signal to the ABS controller 23. The braking detecting means 26 may be employed in the form of a brake pedal sensor operable to detect a depression of an automotive brake pedal, a sensor operable to detect one of ON and OFF states of a brake pedal switch, a sensor operable to detect one of ON and OFF states of a sensor switch used to detect the flow of a hydraulic medium to be supplied to the automotive brakes, or any other sensor capable of providing an output signal indicative of the control of the automotive brakes.

Both of the changeover controller 14 and the ABS controller 23 operate in the following manner which will now be described with particular reference to FIGS. 2 and 3. FIG. 2 illustrates a flowchart showing the sequence of control operation performed by the changeover controller 14 and the ABS controller 23 whereas FIG. 3 illustrates a graph showing a change in vehicle running speed and that in wheel speed relative to the passage of time. In FIG. 3, the change in vehicle running speed is shown by a curve A while the change in wheel speed occurring when the wheels are locked is shown by a curve B.

Referring first to FIG. 2, subsequent to the START block, the flow goes to a decision step S1 at which a decision is made to determine if the output signal from the braking detecting means 26 indicates that the brake pedal switch is in the ON state (shown by a point ta in FIG. 3). The OFF state of the brake pedal switch means that the vehicle wheels are being braked and, in that case, i.e., if the output signal from the braking detecting means 26 indicates that the brake pedal switch is in the OFF state as determined at the decision step S1, the program flow returns. On the other hand, if the output signal from the braking detecting means 26 indicates that the brake pedal switch is in the ON state, the program flow goes to another decision step S2 at which a decision is made to determine if intelligence delivered by respective output signals from the wheel speed detecting means 21a to 21d indicates that some of the vehicle wheels are in an incipient skid condition (that is, if some of the vehicle wheels have their wheel speeds tending to be abruptly reduced as shown by the curve B in FIG. 3). If the result of decision at this decision step S2 indicates that no tendency of the wheel speeds to be abruptly reduced is observed, the program flow goes to a further decision step S3.

On the other hand, if the result of decision at the decision step S2 indicates that some of the vehicle wheels are in the incipient skid condition, i.e., exhibit a tendency of being locked, the program flow goes to step S5 at which the braking pressure applied to each of the vehicle wheels in the incipient skid condition is reduced to suppress the locking of those vehicle wheels. Then, at a subsequent decision step S6, a decision is made to determine if the automotive vehicle is being driven on the direct-coupled 4-WD drive mode, followed by a further decision step S7 at which a decision is made to determine if the reduction of the braking pressure performed at step S5 is a full reduction thereof. Should it be determined at the succeeding steps S6 and S7 that the automotive vehicle is not being driven on the direct-coupled 4-WD drive mode (i.e., the automotive vehicle is being driven on the 2-WD drive mode) and the full reduction f the braking pressure has not been effected even though the automotive vehicle is being driven on the 4-WD drive mode, respectively, the program flow goes to step S8.

Should it be, however, determined at the succeeding steps S6 and S7 that the automotive vehicle is being driven on the 4-WD drive mode and the full reduction of the braking pressure has been effected, respectively, the timing at which the wheel speed attains a minimum possible value shown by a point tc in FIG. 3 is predicted during the execution of the program flow from step S9 to step S12.

The prediction of the timing tc at which the wheel speed attains the minimum possible value is carried out by using the following two assumptions.
(1) The rate of reduction of the braking pressure is constant; and
(2) The coefficient of friction of the road surface, expressed by $\mu$, is substantially constant.

It is to be noted that, since when the full reduction of the braking pressure is carried out, the reduction of the braking pressure takes place as fully as afforded by the system, the rate of reduction of the braking Pressure can be regarded as substantially constant as in the assumption (1). It is also to be noted that the anti-skid brake control is required particularly when the automotive vehicle is running on a slippery surface such as an iced road and, at this time, the coefficient of friction $\mu$ of the road surface may be regarded as substantially constant as in the assumption (2) and it does not depend on the slip ratio.

Based on the assumption (1) discussed above, the braking pressure P(t) at the timing t during a period in which the vehicle wheels are being braked can be expressed by the following equation.

$$P(t) = ae^{bt}$$

wherein a represents the initial braking pressure, i.e., the pressure applied at the start of reduction of the braking pressure which takes place at the timing to shown in FIG. 3, and b represents the rate of reduction of the braking pressure which is a known constant (negative value) determined by respective operating characteristics of the automotive brakes and the anti-skid brake control system employed.

Accordingly, the braking force $f_B(t)$ at that timing can be expressed as follows.

$$f_B(t) = kP(t)$$

wherein k represents the ratio between the braking pressure and the braking force and is a known constant.

On the other hand, based on the assumption (2) discussed above, a reactive force $\mu W$ (W representing the weight imposed on the vehicle wheels) acting from the road surface to the vehicle wheels takes a constant value and, therefore, if the inertia moment of the driving system (i.e., the power train) is expressed by $I_K$, the deceleration G(t) of the vehicle wheels when the wheels are locked can be expressed by the following equation.

$$\begin{aligned} G(t) &= [f_B(t) - \mu W]/I_K \\ &= (kae^{bt} - \mu W)/I_K \end{aligned} \quad (1)$$

Since the above equation (1) contains two unknown factors a and $\mu$, the equation (1) can be solved on two conditions.

Accordingly, in predicting the timing tc at which the vehicle wheel speed attains the minimum possible value, a timer has to be started at step S9, followed by step S10 at which the wheel deceleration G1 at the predetermined timing t1 and the wheel deceleration G2 at the timing t2 are calculated using the respective vehicle wheel speeds.

If those wheel decelerations G1 and G2 are inserted in the equation (1) above the following equations can be obtained.

$$G1 = (kae^{bt1} - \mu W)/I_K \ldots \quad (2)$$

$$G2 = (kae^{bt2} - \mu W)/I_K \ldots \quad (3)$$

The difference between these equations (2) and (3) results in:
$$(G1 - G2) = (ka/I_K)(e^{bt1} - e^{bt2})$$
Therefore, the unknown factor a can be calculated by the following equation.

$$a = I_K(G1 - G2)/k(e^{bt1} - e^{bt2}) \ldots \quad (4)$$

Inserting the value into the equation (2) and rewriting the equation to determine the unknown factor $\mu$ results in:

$$\mu = (kae^{bt1} - I_K G1)/W \ldots \quad (5)$$

Thus, in determining the timing tc at which the wheel speed attains the minimum possible value, the two unknown values a and $\mu$ have to be determined using the equations (4) and (5) above after the wheel decelerations G1 and G2 have been calculated.

Then, when the values a and $\mu$ are inserted into the equation (1) and the value G is fixed to 0 (zero), the timing tc at which the wheel speed attains the minimum possible value can be determined. This calculation is performed at step S12 of the flowchart shown in FIG. 2. Thus, it will readily be understood that the timing tc at which the wheel speed attains the minimum possible value can be determined by the following equation.

$$tc = (1/b)\log(\mu W/ka)$$

A timing detecting means 28 operable to calculate the wheel deceleration in reference to the wheel speed during the course in which as a result of braking, the wheel speed approaches the minimum possible value and then to predict in reference to the calculated wheel deceleration the timing tc at which the wheel speed attains the minimum possible value, is constituted by the program flow from step S9 to step S12.

After the prediction of the timing tc at which the wheel speed attains the minimum possible value during the program flow from step S9 to step S12 the program flow goes to step S13 at which a target changeover timing tb (the timer value T=TO−Td) counted from the timing to at which the timer has started, i.e., at which the pressure reduction has been started) is determined by subtracting a delay time Td characteristic to the 2-WD/4-WD changeover clutch 4 from the timing tc, followed by step S14 at which the changeover clutch 4 is set from the 4-WD drive mode to the 2-WD mode so as to complete the intended changeover at the target changeover timing td (corresponding to the timing at which the count of the timer is zero). Thereafter, the program flow goes to step S8. It is to be noted that an inertia moment varying means 29 operable to reduce the inertia moment of the four-wheel drive device A by effecting the changeover from the 4-WD drive mode to the 2-WD drive mode at the timing tc at which the wheel speed is expected to attain the minimum possible value is constituted by the program flow step S14.

A normal ABS control is carried out at step S8 which is followed by a decision step S3 at which a decision is made to determine if a brake pedal switch is switched over to an OFF state. If the result of decision at step S3 indicates that the brake pedal switch has not been switched over to the OFF state the program flow returns to the decision step S2. On the other hand, if the result of decision at step S3 indicates that the brake pedal switch has been switched over to the OFF state, the program flow goes to step S4 at which a coupling release signal which has been generated at step S14 to effect the changeover from the 4-WD drive mode to the 2-WD drive mode is switched off, followed by the return of the program flow.

As described hereinbefore, under this control, the 4-WD drive mode is maintained until the timing tc at which the wheel speed attains the minimum possible value in the event that some or all of the vehicle wheels have a tendency of being locked when the vehicle wheels are braked. Therefore, any possible drop of the wheel speed of some or all of the vehicle wheels in the incipient skid condition as a result of the large inertia moment brought about by the 4-WD drive system, that is, the wheel deceleration of such some or all of the vehicle wheels, can advantageously be retarded thereby to secure a length of time during which the occurrence of the vehicle wheels being locked subsequent to the reduction in brake Pressure can be suppressed.

In the foregoing embodiment of the present invention, since the 4-WD drive mode is changed over to the 2-WD drive mode at the timing tc at which the wheel speed attains the minimum possible value with the inertia moment of the driving system subsequently lessened consequently, the length of time required to accomplish the restoration of the vehicle wheels under the ABS control (that is, the length of time from the timing tc to the timing td) can be shortened.

Also, in the foregoing embodiment of the Present invention, since the timing detecting means 28 for Predicting the timing tc at which the wheel speed attains the minimum possible value includes a sensor which may concurrently be served by the existing wheel speed detecting means 21a to 21d generally used in the antiskid brake control device B and does not require the use of extra component parts, the system of the present invention is inexpensive to use and can be practically employed in any existing automotive vehicle.

Figure 4:
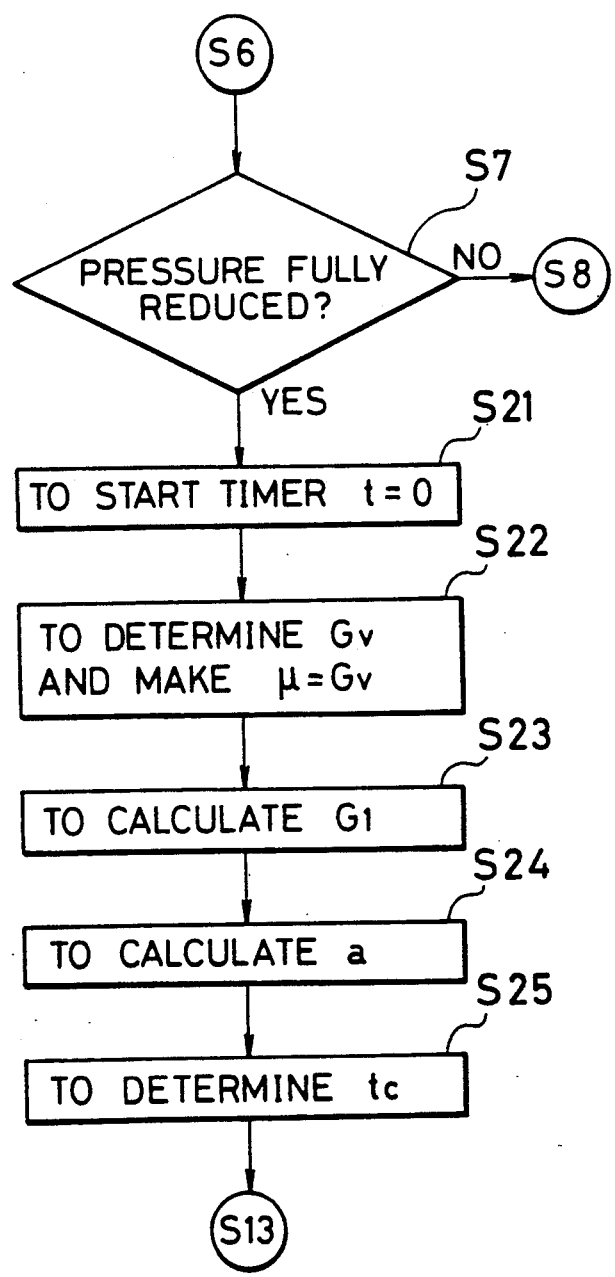
FIGS. 4 and 5 illustrates respective modifications made to the flowchart of FIG. 2, showing different methods of predicating the time at which the wheel speed attains a minimum possible value, respectively.
Figure 5:
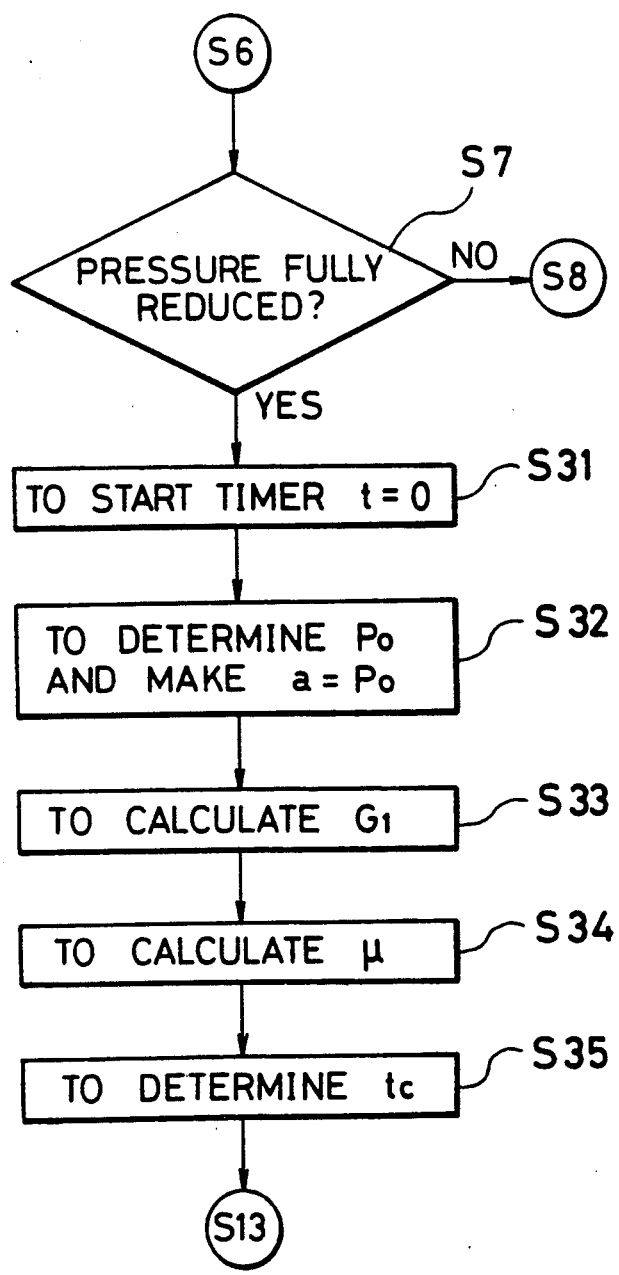

Modifications (FIGS. 4 and 5)

The method of predicting the timing tc which is executed by the timing detecting means 28 may not be always limited to that described hereinbefore and can be embodied in numerous ways, two of which are shown in FIGS. 4 and 5, respectively. It is to be noted that, in each of FIGS. 4 and 5, only a modified flow corresponding to the program flow from step S9 to step S12 shown in FIG. 2 is illustrated for the sake of brevity.

Referring to FIG. 4 showing a first modification of the embodiment shown in and described with reference to FIGS. 1 to 3, an acceleration sensor for detecting respective acceleration of the automotive vehicle in a direction longitudinally thereof is utilized to predicate the timing tc at which the wheel speed attains the minimum possible value. According to the timing predicating method shown in FIG. 4, since the vehicle acceleration exhibited at the time the wheels are locked is represented by the coefficient of friction $\mu$ of the road surface itself, the unknown factor in the equation (1) is only the initial braking pressure a.

Accordingly, when the timing tc is to be predicted, the start of the timer at step S21 is followed by step S22 at which the vehicle longitudinal acceleration Gv occurring at a predetermined timing tl in a direction longitudinally of the automotive vehicle is measured by the use of the acceleration sensor. At the subsequent step S22, the vehicle longitudinal acceleration Gv measured as described above is utilized as the coefficient of friction $\mu$ of the road surface, and at step S23, the wheel deceleration Gl at the timing tl is calculated using the wheel speeds.

Then, when the wheel deceleration Gl calculated at the timing tl is inserted in the equation (1), the following equation can be obtained.

$$G1=(kae^{bt1}-\mu W)/I_K$$

Rewriting the equation (6) results in:

$$a=(GlI_K+\mu W)/ke^{bt1} \ldots \quad (6)$$

Accordingly, when the timing tc at which the wheel speed attains the minimum possible value is to be predicted according to the firs modification under discussion, the initial braking pressure which is the unknown factor is determined using the equation (6) at step S24 after the calculation of the wheel deceleration Gl at step S23. Thereafter, at step S25, the initial braking pressure a so calculated at step S24 is inserted into the equation (1) with the parameter G fixed to 0 (zero), to determine the timing tc by the use of the following equation.

$$tc=(1/b)\log(\mu W/ka)$$

In the modification shown in FIG. 5, the prediction of the timing tc at which the wheel speed attains the minimum possible value is carried out by the use of a pressure sensor for detecting the braking pressure. According to the timing predicting method shown in FIG. 5, the initial braking pressure a used in the equation (1) referred to hereinbefore is represented by an output from the pressure sensor and, therefore, the unknown factor in the equation (1) is only the coefficient of friction $\mu$ of the road surface.

Accordingly, when the timing tc is to be predicted, the start of the timer at step S31 is followed by step S32 at which the hydraulic braking pressure Po occurring at the timing at which the timer is started (t=0) is measured by the use of the pressure sensor. At the subsequent step S33, the wheel speed Gl prevailing at the predetermined timing tl is calculated using the wheel speed.

When the wheel speed Gl so calculated at the timing tl is inserted in the equation (1). the following equation can be obtained.

$$G1=(kae^{bt1}-\mu W)/I_K$$

Rewriting the above equation results in:

$$\mu=(kae^{bt1}-I_K G1)/W \ldots (7)$$

Accordingly, when the timing tc at which the wheel speed attains the minimum possible value is to be predicted according to the second modification under discussion, the coefficient of friction of the road surface which is the unknown factor is determined using the equation (7) at step S34 after the calculation of the wheel speed Gl at step S33. Thereafter, at step S35, the coefficient of friction $\mu$ so calculated at step S34 is inserted into the equation (1) with the parameter G fixed to 0 (zero), to determine the timing tc by the use of the following equation.

$$tc=(1/b)\log(\mu W/ka)$$

Figure 6:
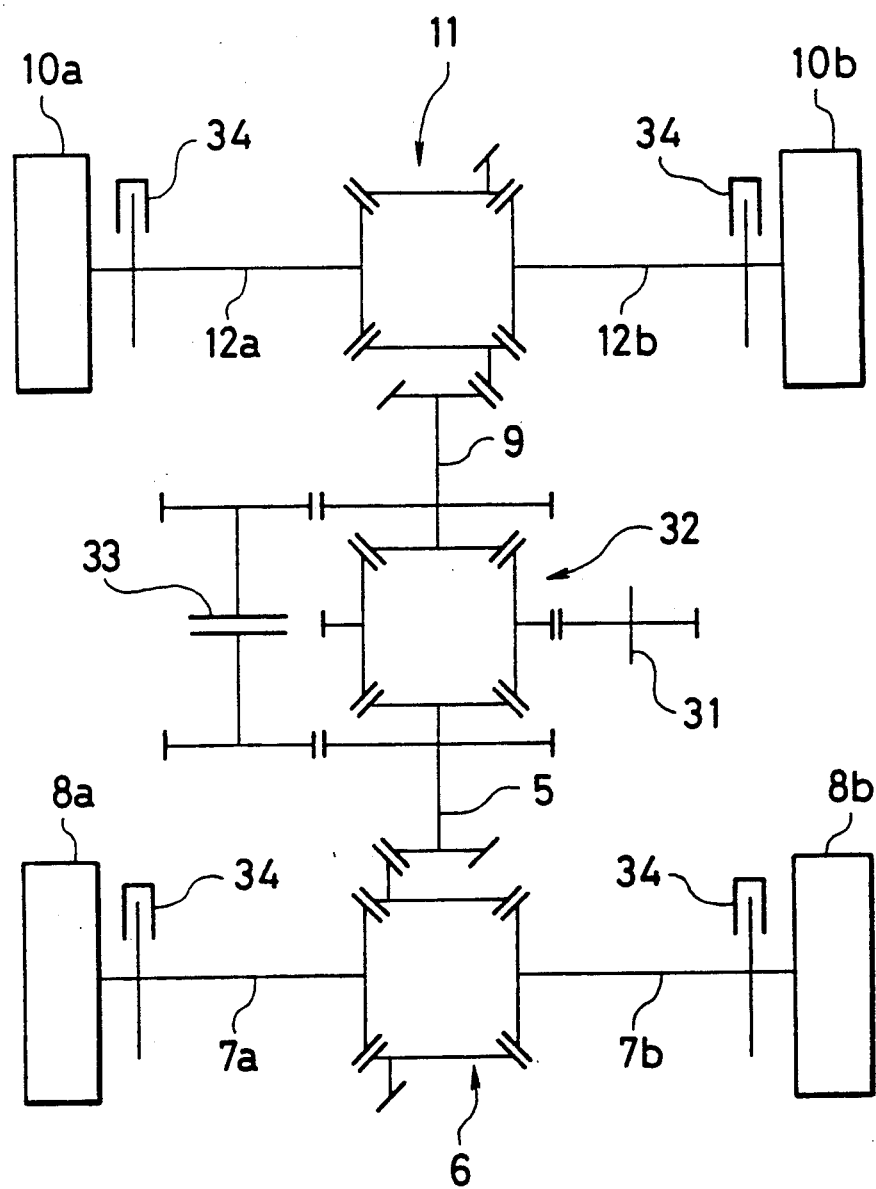
FIG. 6 is a schematic diagram showing the anti-skid brake control system according to a second preferred embodiment of the present invention, shown together with the 4-wheel drive system.

Second Preferred Embodiment (FIG. 6)

The drive system of the four-wheel drive automotive vehicle according to a second preferred embodiment of the present invention is shown in FIG. 6. The four-wheel drive device used in the four-wheel drive automotive vehicle comprises a center differential gear unit 32 operable to distribute the drive of the engine, outputted from an output shaft 31 of the automotive transmission, to the front propeller shaft 5 and also to the rear propeller shaft 9 so as to permit differential rotation of the front paired wheels 10a and 10b and the rear paired wheels 8a and 8b, and a differential lock device 33 drivingly Coupled parallel to the center differential gear unit 32, which device 33 may comprise a clutch. The differential lock device 33 is capable of assuming one of coupled and released positions and, when the differential lock device 33 is switched over to the coupled position, the front and rear propeller shafts 9 and 5 are drivingly coupled with each other, disabling a differential function of the center differential gear unit 32. With the differential lock device 33 held in the coupled position as described above, the front paired wheels 10a and 10b and the rear paired wheels 8a and 8 bare driven at substantially equal speeds respectively by the front propeller shaft 9 and the rear propeller shaft 5. Specifically, the drive of the front propeller shaft 9 is transmitted to the front vehicle wheels 10a and 10b through the front differential gear unit 11 by means of the respective front axles 12a and 12b, while the drive of the rear propeller shaft 5 is transmitted to the rear vehicle wheels 8a and 8b through the rear differential gear unit 6 by means of the respective rear axles 7a and 7b. In other words, with the differential lock device 33 held in the coupled position, the drive of the output shaft 31 of the automotive transmission is substantially uniformly distributed to the front and rear propeller shafts 9 and 5 through the center differential gear unit 32 without being driven at different speeds.

On the other hand, when the differential lock device 33 is switched over to the released position, the front and rear propeller shafts 9 and 5 are drivingly disconnected from each other so that, by the action of the differential function of the center differential gear unit 32, the front paired wheels 10a and 10b and the rear paired wheels 8a and 8b can be driven at respective speeds which may be different from each other. In other words, with the differential lock device 33 held in the released position, the drive of the output shaft 31 of the transmission can be transmitted to the front and rear propeller shafts 9 and 5 at respective proportions which may be different from each other, allowing the center differential gear unit 32 to drive the front and rear propeller shafts 9 and 5 differently.

In FIG. 6, reference numeral 34 represents a brake cylinder to be used for each of the vehicle wheels 8a, 8b, 10a and 10b for actuating the respective brake unit.

Even in the drive system shown in and described with reference to FIG. 6, as is the case with the foregoing first preferred embodiment of the present invention, the differential lock device 33 is switched over from the coupled position to the released position at the timing at which the wheel speed during the braking attains the minimum possible value. As hereinbefore described, with the differential lock device 33 set in the coupled position, the front paired wheels 10a and 10b and the rear paired wheels 8a and 8b are driven at substantially equal speeds, whereas with the differential lock device 33 set in the released position the front paired wheels 10a and 10b and the rear paired wheels 8a and 8b are driven at respective speeds different from each other. The system according to the second preferred embodiment is particularly advantageous in that the braking performance can be effectively improved.

Third Preferred Embodiment (FIGS. 7 to 11)

Figure 7:
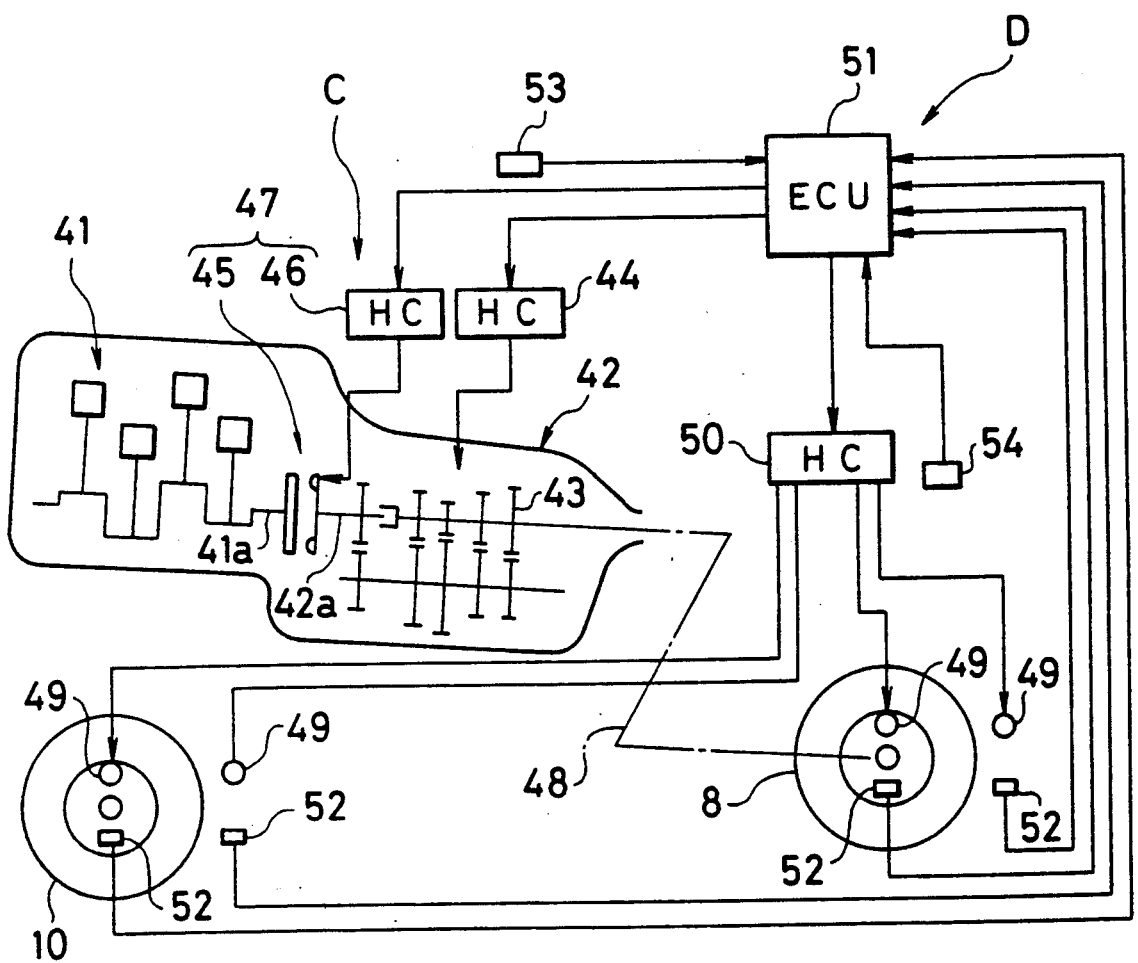
FIG. 7 is a schematic diagram showing the anti-skid brake control system according to a third preferred embodiment of the present invention, shown as applied to the drive system of a front-engine, rear-drive automotive vehicle.

The third preferred embodiment of the present invention as applied to the automotive vehicle of a front-engine, rear-drive type is shown in FIGS. 7 to 11. Referring first to FIG. 7 showing the drive system employed in the front-engine, rear-drive automotive vehicle and the anti-skid brake control system used therein, an automotive engine is shown by 41. An output shaft 41a of the automotive engine 41 is drivingly coupled with an input shaft 42a of a transmission 42 which is, in the illustrated embodiment, employed in the form of an automatic transmission comprising a speed-change gear train 43, as in the case with the known manual automotive transmission, and a controller (HC) 44 operable in response to an electric control signal to control the gear train 43 to attain any desired speed or gear ratio. Although not shown, the controller 44 includes a fluid-responsive actuator adapted to actuate a gear ratio selecting mechanism included in the gear train 43 thereby to attain the desired gear ratio. For this purpose, the controller 44 may be comprised of, in addition to the fluid pressure responsive actuator, an electromagnetic valve assembly for controlling a hydraulic pressure to be applied to the fluid pressure responsive actuator.

A clutch 45 is interposed between the output shaft 41a of the automotive engine 41 and the input shaft 42a of the transmission 2 for selectively coupling and disconnecting the output shaft 41a of the automotive engine 41 with and from the input shaft 42a of the transmission 42, respectively. This clutch 45 in combination with a controller (HC) 46 operable in response to a control signal to bring the clutch 45 selectively into one of the coupled and disconnected positions constitutes an automatic clutch unit 47. The clutch controller 46 may comprise a clutch actuator adapted to actuate a clutch plate according to a fluid pressure such as, for example, the induction pressure (i.e., the negative pressure developed in an intake manifold) or a fluid pressure, and an electromagnetic valve assembly for controlling a hydraulic pressure applied to the clutch actuator.

A power train for transmitting the drive of the automotive engine 41 to the transmission 43 through the clutch 45 and then from the transmission 43 to a propeller shaft 48 to drive the rear paired wheels 8 after the speed has been selected by the setting of the transmission 43 is constituted by a two-wheel drive device C. It is to be noted that, in the embodiment shown in FIG. 7, the front paired wheels 10 are not drivingly coupled with the automotive engine 41 and are rotatable in contact with the road surface when the automotive vehicle runs with the rear paired wheels 8 driven by the automotive engine 41.

All of the front and rear wheels 10 and 8 are operatively associated with respective brake cylinders 49 each adapted to be operated by a foot-operated brake pedal (not shown). For controlling the braking force, a brake controller (HC) 50 is employed which may comprise an electromagnetic valve assembly incorporated in a fluid pressure supply circuit associated with each of the brake cylinders 49 so that, even during a period in which the braking is effected by depressing the foot-operated brake pedal, the brake controller 50 can respond to a control signal to control the fluid pressure to be supplied to each of the brake cylinders 49. This brake controller 50, in combination with a wheel-lock detecting means 57 included in a control unit (EUC) 51 for detecting the incipient skid condition of the vehicle wheels, as will be described later, and various detectors 52, 53 and 54, constitute an anti-skid brake control device D.

Each of the controllers 44, 46 and 50 referred to above is controlled by the control unit 51 comprised of a microcomputer. For this purpose, the control unit 51 receives wheel speed signals supplied respectively from the wheel speed detectors 52, employed one for each wheel for detecting, and generating the respective wheel speed signal indicative of, the speed of rotation of the associated vehicle wheel; an accelerator opening angle signal generated from an accelerator opening angle detector 53 for detecting the opening angle (an amount of the depression of an accelerator pedal) of the accelerator pedal; and a brake pressure signal generated from the brake pressure detector 54 for detecting the braking pressure proportional to the depression of the foot-operated brake pedal (not shown).

Figure 8:
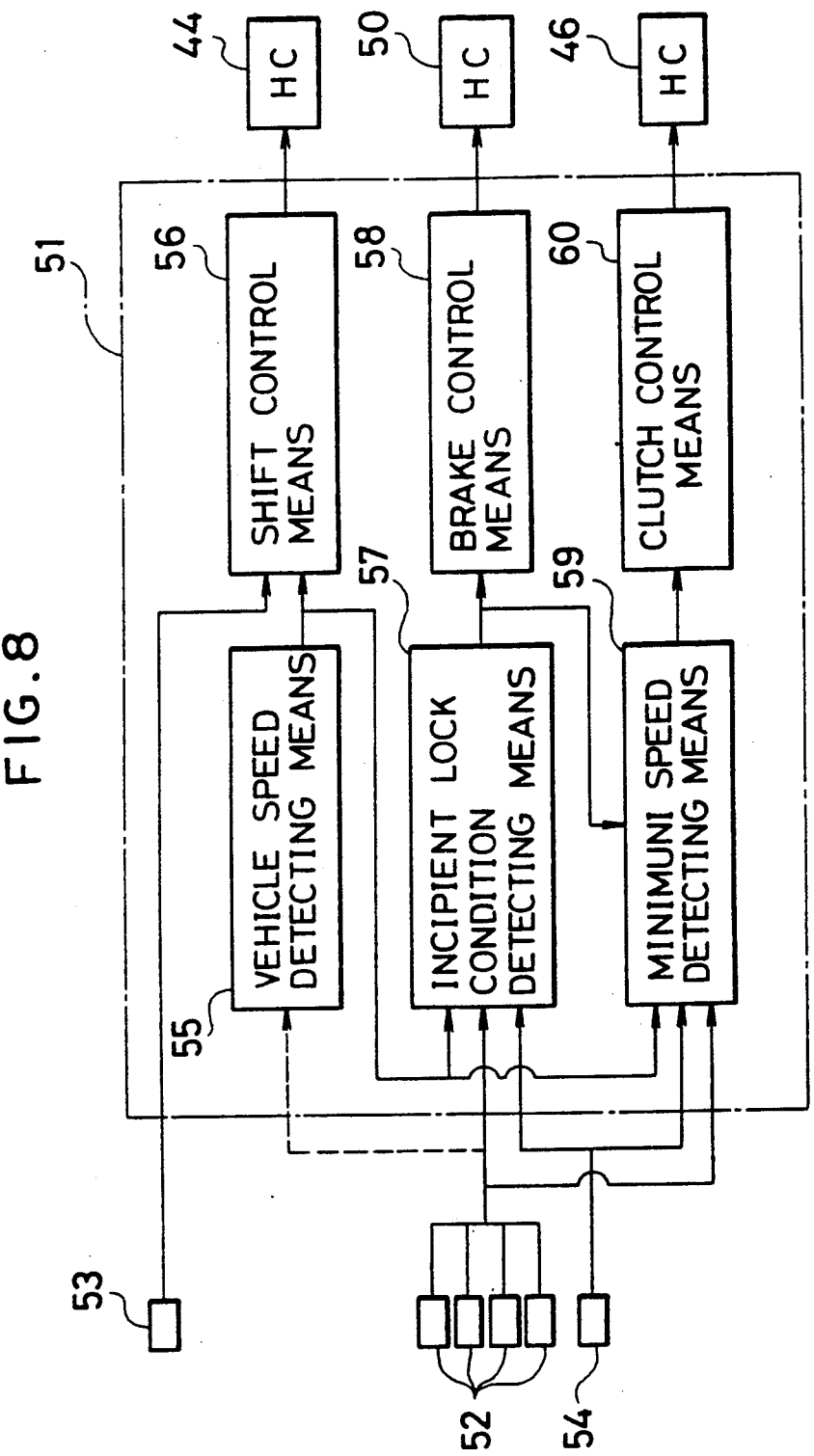
FIG. 8 is a block diagram showing a control unit used in the anti-skid brake control system shown in FIG. 7.

As shown in FIG. 8, the control unit 51 includes a vehicle running speed detecting means 55, a shift control means 56, the wheel lock detecting means 57, a brake control means 58, a timing detecting means 59 for detecting the timing tc at which the wheel speed attains the minimum possible value, and a clutch control means 60.

The vehicle running speed detecting means 55 is operable to calculate the vehicle running speed in reference to the respective speed signals supplied from, for example, the wheel speed detector 52 and to detect, as a vehicle running speed, the highest wheel speed of all wheel speeds during the braking taking place. The detection of the vehicle running speed may not be always limited thereto, but may be made by detecting the number of revolutions of the input shaft of the transmission during a normal running of the automotive vehicle and may be carried out by calculating the vehicle running speed with the use of an acceleration sensor for detecting, during the braking taking place, the acceleration of the automotive vehicle acting in a direction longitudinally of the automotive vehicle.

The transmission control means 56 is so designed as to compare the vehicle running speed, detected by the vehicle running speed detecting means 55, and the accelerator opening angle detected by the accelerator Opening sensor 53 which may be operatively coupled with the accelerator pedal, with a predetermined speed change pattern defining a shift line coordinated with the accelerator opening angle and the vehicle running speed, and then to output a shift control signal which is subsequently supplied to the transmission controller 44 of the transmission 42.

The wheel lock detecting means 57 is so designed as to be operable in response to the vehicle running speed signal supplied from the vehicle running speed detecting means 55, the wheel speed signals supplied from the wheel speed detectors 52 and the braking pressure signal supplied from the braking pressure detector 54 to determine the occurrence of the incipient skid condition in which, during the braking taking place, the wheel speed is lowered relative to the vehicle running speed by a quantity greater than a predetermined value. The brake control means 58 is operable to generate to the brake controller 50 the brake control signal necessary to relieve the braking pressure applied to some of the brake cylinders 49 associated respectively with the vehicle wheels and 10 then exhibiting the incipient skid condition, in the event that the wheel lock detecting means 57 detects the occurrence of the incipient skid condition. As hereinbefore described, the brake controller 50, the wheel lock detecting means 57, the brake control means 58 and the detectors 52 to 54 constitute the anti-skid brake control device D.

The timing detecting means 59 is operable to detect the timing tc (See FIG. 39) at which the wheel speed attains the minimum possible value consequent upon the locking occurring in some or all of the vehicle wheels and is similar to the timing detecting means 28 used in the first preferred embodiment of the present invention in that reference is made to the wheel speeds to determine the timing tc. The clutch control means 60 is so designed as to generate to the clutch controller 46 the control signal necessary to bring the clutch 45 to the disconnected position at the predicted timing tc. The generation of the control signal from the clutch control means 60 to the clutch controller 46 takes place at a timing determined in consideration of the delay in operation of the automatic clutch unit 47. This clutch control means 60 has a function of the inertia moment varying means operable to lowering the inertia moment of the two-wheel drive device C at the predicted timing tc.

Figure 9:
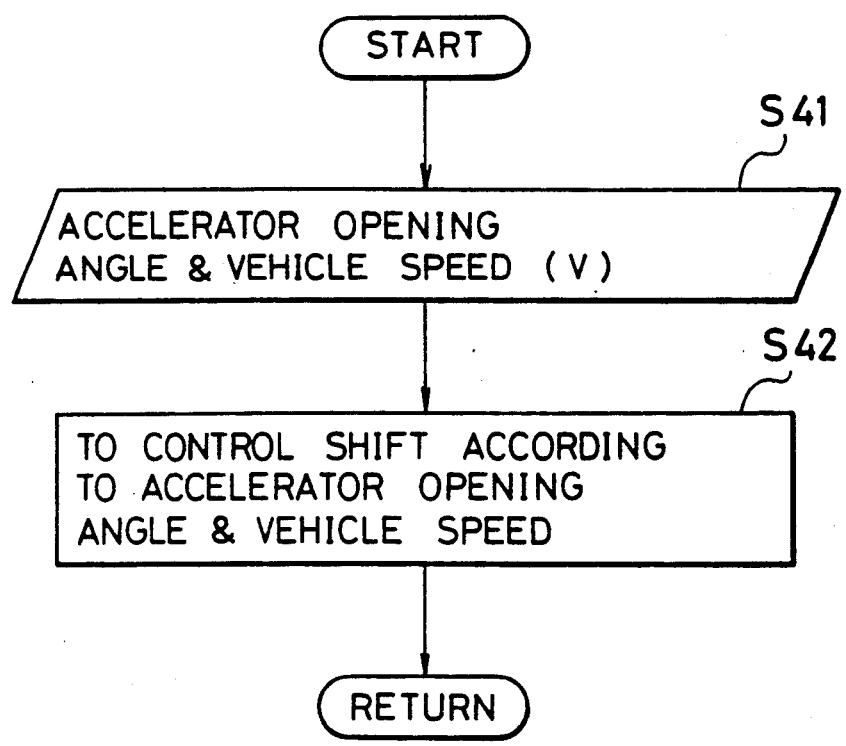
FIGS. 9 to 11 are flowcharts showing different sequences of operation of the control unit shown in FIG. 8, respectively.
Figure 10:
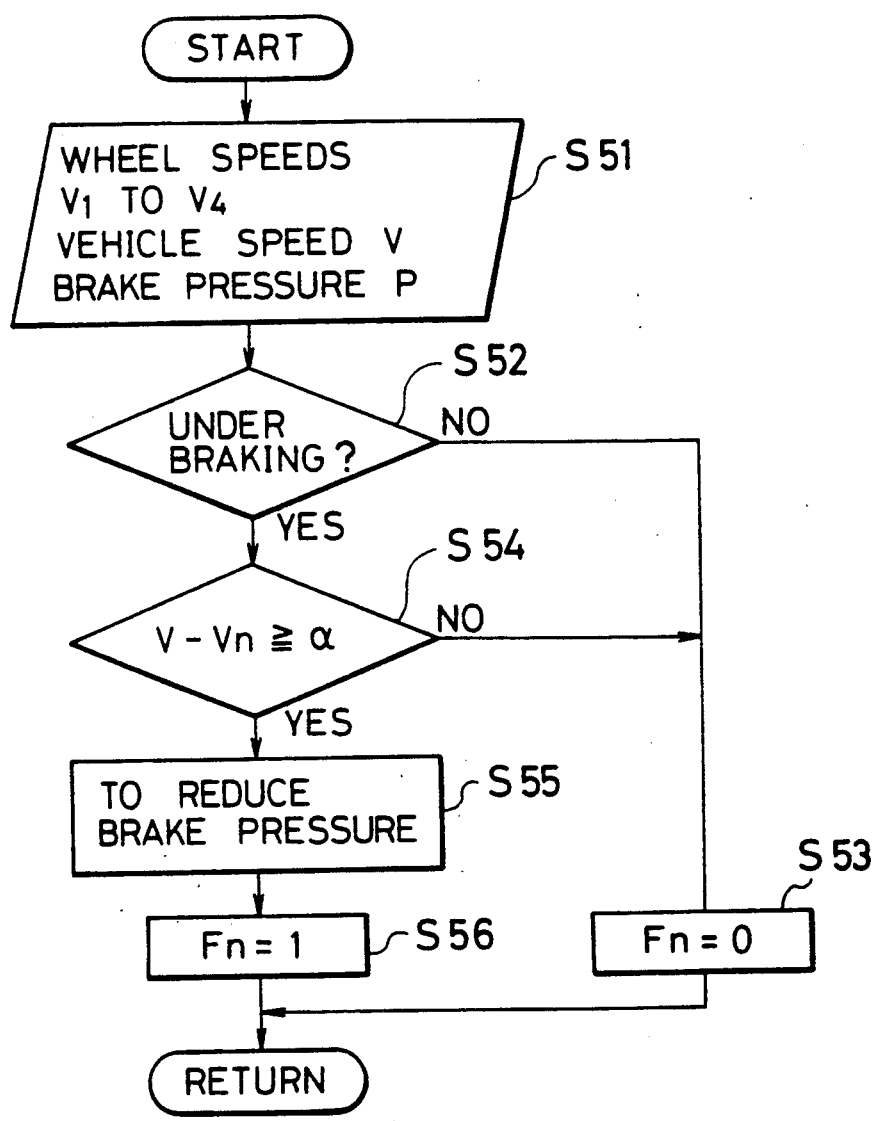
Figure 11:
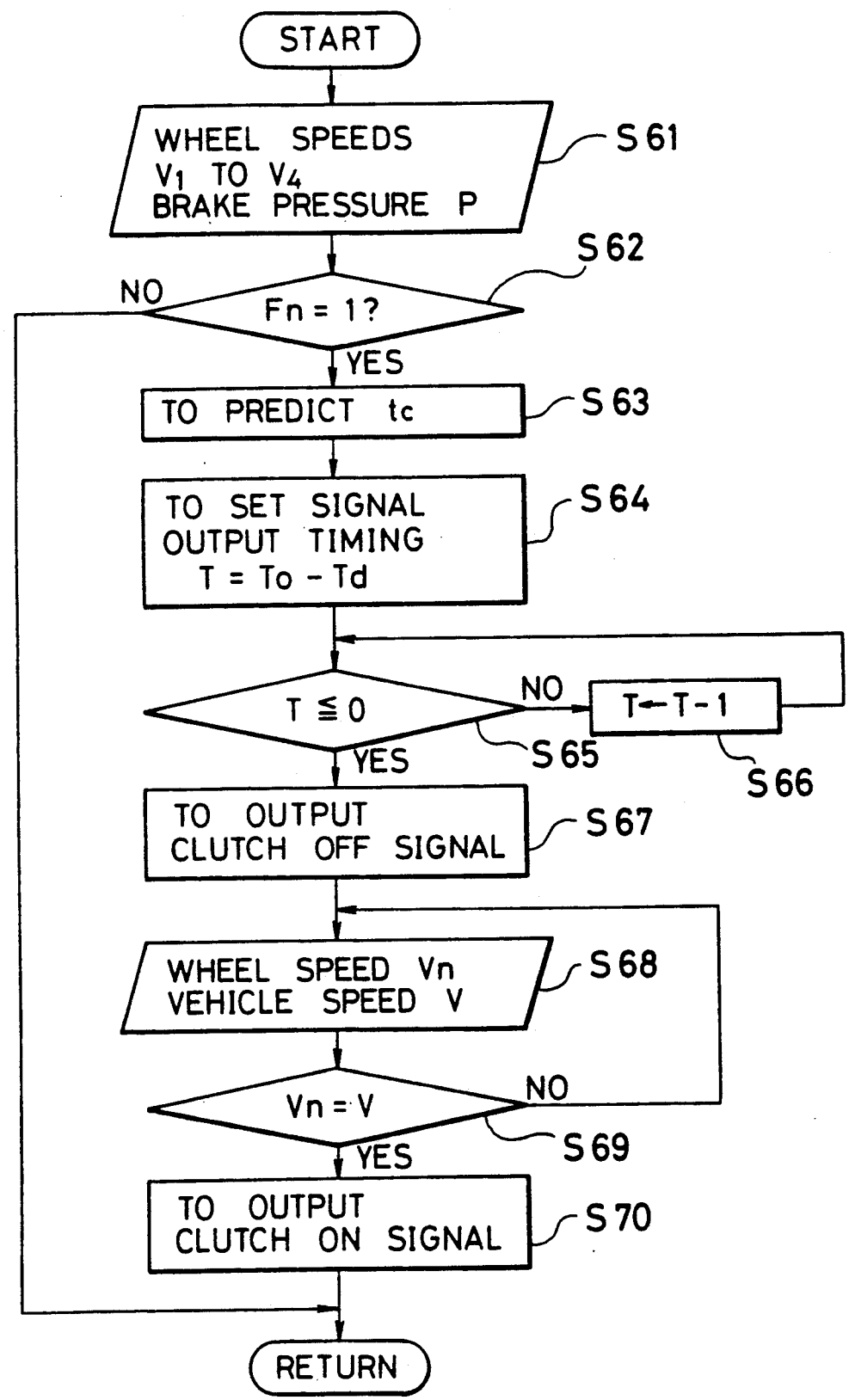

FIGS. 9 to 11 illustrates flowcharts showing the sequence of operation of the above described various means included in the control unit 51, shown for the illustrative purpose, reference to which will now be made.

FIG. 9 is a flowchart showing the sequence of control effected to the transmission 2. In this flowchart of FIG. 9, subsequent to the start of the program flow, the respective signals indicative of the accelerator opening angle and the vehicle running speed V are inputted at step S41 which is followed by step S42 at which the shift is controlled according to the accelerator opening angle and the vehicle running speed. In other words, a signal necessary to change the speed or gear ratio when intelligence conveyed by the accelerator opening angle and the vehicle running speed indicates that an automotive operating condition changes in such a way as to traverse the shift life of the predetermined speed change pattern is outputted to the controller 44.

In the flowchart shown in FIG. 10 which shows the sequence of control of the anti-skid brake control device, subsequent to the start of the program flow, the respective signals indicative of the wheel speeds V1 to V4, the vehicle running speed V and the braking pressure P are inputted at step S51 which is followed by a decision step S52 at which a decision is made to determine if the braking (i.e., depression of the foot-operated brake pedal) is effected in reference to the braking pressure P. If the result of decision at step S52 indicates that the braking is not effected, a flag Fn is set to 0 (zero) at step S53, followed by the return of the program flow.

On the other hand, in the event that the result of decision at step S52 indicates that the braking is effected, another decision is made at step S54 to determine if the difference between the vehicle running speed V and the wheel speed Vn is equal to or greater than the predetermined value α. This decision at step S54 takes with respect to each of the wheel speeds V1 to V4 for the purpose of determining if some of the vehicle wheels are brought into the incipient skid condition. If no incipient skid condition occur in any one of the vehicle wheels as determined at step S54, the program flow goes to step S53 and then return. In this case, the braking pressure proportional to the depression of the foot-operated brake pedal is applied to each of the brake cylinders 49 and, hence, the usual braking operation takes place.

On the other hand, if some of the vehicle wheels 8 and 10 are brought into the incipient skid condition as determined at step S54, the program flow goes to step S55 at which the braking pressure applied to one or some of the brake cylinders 49 which are associated with the corresponding vehicle wheels 8 brought into the incipient skid condition are reduced to lessen the braking force (i.e., to relieve the associated brake cylinders). Thereafter, the program flow goes to step S56 at which the flag Fn is set to 1, followed by the return of the program flow.

FIG. 11 illustrates the flowchart showing the sequence of control of the automatic clutch unit 47. In the flowchart, subsequent to the start of the program flow, the respective signals indicative of the wheel speeds V1 to V4 and the braking pressure P are inputted at step S61. Then, at step S62, a decision is made to determine if the flag Fn is set to 1 for the purpose of determining whether or not the anti-skid brake control device is operated, i.e., whether or not some of the vehicle wheels are locked. Where the result of decision at step S61 indicates that the anti-skid brake control device is not operated, that is, the flag Fn is not set to 1, the program flow returns.

On the other hand, where the result of decision at step S62 indicates that the anti-skid brake control device is operated, that is, the flag Fn is set to 1, the program flow goes to step S63 at which the timing tc (See FIG. 3) at which the wheel speed of the rear wheels 8 then held in the incipient skid condition attains the minimum possible value is predicted and the length of time T0 from the timing to at which the prediction is started to the timing tc is also calculated. At subsequent step S64, the delay time Td characteristic of the automatic clutch unit 47 is subtracted from the length of time T0 to provide a timer value T for the determination of a signal output value. Thereafter, at successive steps S65 and S66, a program flow for decrementing the timer value T until the timer value T attains a value equal to or smaller than 0 (zero) is repeated and, when the timer value T attains the value equal to or smaller than 0, a clutch OFF signal is outputted to the controller 46 at step S67. After the outputting of the clutch OFF signal, and at successive steps S68 and S69, the respective signals indicative of the wheel speed Vn and the vehicle running speed V are inputted while the clutch 7 is kept in the disengaged (OFF) position until the wheel speed Vn attains a value equal to the vehicle running speed V. When the wheel speed Vn attains the value equal to the vehicle running speed V, the program flow goes to step S70 at which a clutch ON signal is outputted, followed by the return of the program flow.

It is to be noted that the automatic clutch unit 47 is controlled not only when the anti-skid brake control device is operated as hereinbefore described, but also when the transmission is operated to change the speed or gear ratio, and also at the time of start of the automotive vehicle. The details of control of the automatic clutch unit 47 which takes place when the transmission is operated to change the speed or gear ratio will not be herein described nor shown, since they do not constitute subject matter of the present invention.

The operation of the system according to the foregoing preferred embodiment of the present invention will now be described. It is, however, to be noted that respective changes in wheel speed and vehicle running speed during the braking taking place are substantially similar to those shown in the graph of FIG. 3.

Specifically, during the braking in which the foot-operated brake pedal is depressed, i.e., subsequent to the timing ta shown in FIG. 3, the brake cylinders 49 are actuated and the vehicle running speed V progressively lowers as shown by the curve A in FIG. 3. If at this time any one of the vehicle wheels 8 and 9 undergoes a slip relative to the road surface and, consequently, an incipient skid condition in which the wheel speed Vn is abruptly reduced occurs in such one of the vehicle wheels 8 and 10, the routine shown in FIG. 8 is executed so that the anti-skid brake control device is actuated to reduce the braking pressure at the timing to at which the difference between the vehicle running speed V and the wheel speed Vn attains the value equal to or greater than the predetermined value. Upon the actuation of the anti-skid brake control device effected in the manner described above, the braking force is lessened, however, the wheel speed Vn increase to approach the vehicle running speed once having reduced to a certain extent subsequent to the timing to.

By the execution of the routine shown in FIG. 11 in dependence on the change of the wheel speed Vn, the clutch OFF signal is outputted subsequent to the actuation of the anti-skid brake control device and at the timing tb attained after the passage of the time T which has been determined in reference to the length of time To up until the timing tc and the delay time Td characteristic of the automatic clutch unit 47 and, therefore, the clutch 45 is brought into the disconnected position at the timing tc at which the wheel speed attains the minimum value, thereby facilitating the restoration of the vehicle wheels from the locked condition. In other words, so long as the automotive engine 41 and the paired rear drive wheels 8 are drivingly coupled directly through the clutch, the inertia moment of the drive system acts during a period in which the wheel speeds exhibit a tendency of being locked, while the resistance on the side of the automotive engine 41 acts so as to suppress a drop of the wheel speeds. However, during a period in which the wheel speeds restore to the values substantially equal to or equal to the vehicle running speed after the wheel speeds have once attained the minimum value, the inertia moment of the drive system is reduced.

In other words, the clutch 45 is kept ON until the timing tc at which the wheel speed attains the minimum possible value, so that a relatively large inertia moment of the drive system including the resistance imposed by the automotive engine 41 can suppress the abrupt drop of the wheel speed. On the other hand, the clutch 45 is switched OFF during the restoration from the timing tc, so as to exclude the action on the side of tee automotive engine 41 which would suppress an increase of the wheel speed, that is, to reduce the inertia moment of the drive system, so that the restoration of the wheel speed Vn can be accelerated as compared with the case (shown by the two-dotted chain line in FIG. 3) which occur when the clutch 45 is switched ON during the restoration. In view of the foregoing, the braking performance can be improved according to the present invention in such a way that the anti-skid brake control performance can be increased and the braking distance can be shortened.

When the wheel speed Vn restores to the value approaching the vehicle running speed V, the automatic clutch unit 47 is brought back into the clutch ON state at the timing td. On the other hand, consequent upon the restoration, the anti-skid brake control device is brought to a halt and the usual or normal braking condition can be resumed. Should the incipient skid condition occur again subsequent to the restoration, the actuation of the anti-skid brake control device and the ON and OFF control of the clutch of the automatic clutch unit 47 are repeated in the manner as hereinbefore described.

It is to be noted that, although in describing the third preferred embodiment of the present invention the transmission has been described and shown as of an automatically controlled model, the present invention may not be always limited to the use of such automatic transmission, but any other transmission such as, for example, a well-known manual transmission may be employed.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the spirit and scope of the present invention as delivered from the claims annexed hereto, to be construed as included therein.

What is claimed is:

1. A brake control system for use in an automotive vehicle having a plurality of driven wheels, comprising:
    an anti-skid brake control means for outputting control signals to anti-skid brake modulator means, said anti-skid brake modulator means being operatively associated with each of the driven wheels and being for lowering a braking force applied to the respective driven wheel during the first half of a control period initiated by braking operation in which the driven wheel is incipiently locked, during which first half period the wheel speed of the driven wheel decreases from vehicle running speed; and
    an inertia moment varying means for reducing an inertia moment of a power train coupled to the driven wheel on which the associated anti-skid brake modulator means acts, during a latter half of said control period, during which latter half period the wheel speed of the driven wheel is restored to a value substantially equal to vehicle running speed.

2. The control system as claimed in claim 1, wherein said inertia moment varying means reduces the inertia moment of the power train coupled to the driven wheel on which said anti-skid brake modulator means acts, when the wheel speed of said drive wheel starts restoring.

3. The control system as claimed in claim 2, wherein said inertia moment varying means comprises computation and storage means operable to predict a timing at which a wheel speed of the driven wheel attains a minimum value before restoring, and is operable then to reduce the inertia moment of the power train for the driven wheel on which said anti-skid brake modulator means acts, at the predicted timing.

4. The control system as claimed in claim 3, further comprising a wheel speed detecting means for detecting the wheel speed of said driven wheel on which said anti-skid means acts, and wherein said inertia moment varying means comprises computation and storage means operable in response to a signal from said wheel speed detecting means to predict the timing at which the wheel speed of said driven wheel attains the minimum value before restoring on the basis of the wheel speed of said driven wheel on which the anti-skid brake modulator means acts.

5. The control system as claimed in claim 4, wherein said power train comprises a differential gear unit permitting a differential rotation of the driven wheels relative to each other, and a differential rotation restricting means for restricting an differential operation of the differential gear unit, and wherein said inertia moment varying means is operable to release said differential rotation restricting means to permit the differential gear unit to perform the differential operation at said predicted timing.

6. The control system as claimed in claim 4, wherein said power train includes a 2-WD/4-WD changeover clutch for selectively setting a mode of driving the vehicle into one of two-wheel drive mode and four-wheel drive mode, and wherein said inertia moment varying means is operable to switch from the four-wheel drive mode over to the two-wheel drive mode at said predicted timing.

7. The control system as claimed in claim 4, wherein said power train includes a clutch operable to connect and disconnect an automotive engine with the driven wheels, and wherein said inertia moment varying means is operable to release said clutch at said predicted timing to disconnect association of the automotive engine with said driven wheel on which said anti-skid brake modulator means acts.

8. The control system as claimed in claim 3, further comprising a braking force detecting means for detecting a braking force applied to said driven wheel on which said anti-skid brake modulator means acts, and wherein said inertia moment varying means comprises computation and storage means operable in response to a signal from the braking force detecting means to predict the timing at which the wheel speed of said driven wheel attains the minimum value before restoring on the basis of the braking force applied to said driven wheel.

9. The control system as claimed in claim 8, wherein said power train comprises a differential gear unit permitting a differential rotation of the driven wheels relative to each other, and a differential rotation restricting means for restricting an differential operation of the differential gear unit, and wherein said inertia moment varying means is operable to release said differential rotation restricting means to permit the differential gear unit to perform the differential operation at said predicted timing.

10. The control system as claimed in claim 8, wherein said power train includes a 2-WD/4-WD changeover clutch for selectively setting a mode of driving the automotive vehicle into one of two-wheel drive mode and four-wheel drive mode, and wherein said inertia moment varying means is operable to switch from the four-wheel drive mode over to the two-wheel drive mode at said predicted timing.

11. The control system as claimed in claim 8, wherein said power train includes a clutch operable to connect and disconnect an automotive engine with the driven wheels, and wherein said inertia moment varying means is operable to release said clutch at said predicated timing to disconnect association of the automotive engine which said driven wheel on which said anti-skid means acts.

12. The control system as claimed in claim 3, further comprising a longitudinal acceleration detecting means for detecting a longitudinal acceleration of the automotive vehicle acting in a direction longitudinally thereof, and wherein said inertia moment varying means comprises computation and storage means operable in response to a signal from the longitudinal acceleration detecting means to predict the timing at which the wheel speed of said driven wheel attains the minimum value before restoring on the basis of the longitudinal acceleration detected by said longitudinal acceleration detecting means.

13. The control system as claimed in claim 12, wherein said power train comprises a differential gear unit permitting a differential rotation of the driven wheels relative to each other, and a differential rotation restricting means for restricting an differential operation of the differential gear unit, and wherein said inertia moment varying means is operable to release said differential rotation restricting means to permit the differential gear unit to perform the differential operation at said predicted timing.

14. The control system as claimed in claim 12, wherein said power train includes a 2-WD/4-WD changeover clutch for selectively setting a mode of driving the automotive vehicle into one of two-wheel drive mode and four-wheel drive mode, and wherein said inertia moment varying means is operable to switch from the four-wheel drive mode over to the two-wheel drive mode at said predicted timing.

15. The control system as claimed in claim 12, wherein said power train includes a clutch operable to connect and disconnect an automotive engine with the driven wheels, and wherein said inertia moment varying means is operable to release said clutch at said predicted timing to disconnect association of the automotive engine with said driven wheel on which said anti-skid brake modulator means acts.

* * * * *